United States Patent [19]

Boman et al.

[11] 4,187,041

[45] Feb. 5, 1980

[54] METHOD FOR CONSOLIDATING A BODY OF EARTH

[75] Inventors: Per Boman, Täby; Bengt Broms, Vällingby, both of Sweden

[73] Assignee: Linden-Alimak A.B., Skellefteå, Sweden

[21] Appl. No.: 4,344

[22] Filed: Jan. 18, 1979

Related U.S. Application Data

[63] Continuation of Ser. No. 637,169, Dec. 3, 1975, abandoned.

[51] Int. Cl.² .............................................. E02D 3/14
[52] U.S. Cl. ...................................... 405/263; 405/50
[58] Field of Search ................... 405/36, 50, 151, 229, 405/258, 263, 266, 269

[56] References Cited

U.S. PATENT DOCUMENTS

| | | | |
|---|---|---|---|
| 2,099,328 | 11/1937 | Casagrande | 405/131 X |
| 2,232,898 | 2/1941 | Ackley | 405/263 |
| 3,274,782 | 9/1966 | Landau | 405/50 |
| 3,667,236 | 6/1972 | Rosene | 405/50 |
| 3,707,848 | 1/1973 | Chelminski | 405/45 |
| 3,875,751 | 4/1975 | Paus | 405/263 |
| 3,971,222 | 7/1976 | Griffith | 405/263 |

FOREIGN PATENT DOCUMENTS 441943  1/1936  United Kingdom .

*Primary Examiner*—David H. Corbin

[57] ABSTRACT

Relatively impermeable earth such as clay is made permeable so as to effectively produce drains or draining layers by injecting into the earth one or more substances chemically reacting with and/or physically cooperating with one or more of the natural constituents of the earth to thereby increase the permeability within the injection zone and to thereby produce a drain or a draining layer.

3 Claims, No Drawings

METHOD FOR CONSOLIDATING A BODY OF EARTH

This is a continuation, of application Ser. No. 637,169 filed Dec. 3, 1975, now abandoned.

The present invention relates to a method of providing draining layers or drains in earth for transporting water from or to the earth.

Great land areas of the earth, in Sweden approximately 1/20 of the total land area, consist of soft clay. For historical reasons the clay is located mostly in areas where the urbanization is most rapid. Within many areas there has hitherto, however, been enough "solid" ground for buildings and the like but now the land, particularly within the big city regions, has begun to be so expensive, that also land consisting of soft clay must be utilized to a greater extent than earlier.

The possibility of building on or in clay is determined to a high degree by the shearing strength of the clay, which is the deciding factor for stability when a load in the form of a building is placed on the clay, or for the stability of a clay slope.

The pore water overpressure in the clay gives rise to water flow therefrom. The clay is, however, very dense, and therefore the pore pressure equalization, the consolidation, will take a very long time. The Swedish glacial clays are approximately 10.000 years old and have therefore generally had enough time to consolidate for their natural weight. If, however, a further load is placed on the clay, e.g. a building, a pore overpressure in the clay will normally be the result, which is successively equalized implying that settlings occur. These settlings can damage the building more or less seriously, if no special measures have been taken.

Some lowering of the soil water level and thereby an increasing risk for settlings, will normally always be the consequence when an area is exploited. The building foundations and pipes act as drains thus draining off the water. Hardening of the ground and draining off of surface water involve a reduced infiltration of rain water. Trees consume great amounts of water, especially during dry periods. Leaky tunnels in rock can also cause lowering of the soil water level, as well as pumping off water, e.g. for human use.

By preloading land before exploitation and at the same time draining, in order to facilitate the outflow of water from the clay caused thereby, the water content of the clay can be lessened and the compressibility thereof be increased to a degree enough for eliminating problems of the kind mentioned above, at the same time as the shearing strength of the clay is also normally increased.

The most usual way of bringing about a desired preload is by means of a filling, a static mass. The clay can also to some extent be made to consolidate by means of a dynamic mass—a falling weight.

The stratum of air surrounding the earth loads the earth surface by approximately 10 tons per $m^2$. If the clay is separated from the air by means of a plastics foil, or the like, and the air below the foil is pumped away a load is obtained that in practice can amount to approximately 8 tons $m^2$. An advantage with this method, the vacuum method, is that the stability is not changed, since the load of air also acts upon the surroundings. Water, as well as air, can be used for preloading the clay. The clay must also in this case be separated from the water by means of a foil, at the same time as the outflowing pore water must be drained off.

Vertical draining has for its purpose to shorten the path along which water must flow through the clay and thereby to accelerate the primary consolidation process when there is a pore overpressure in the clay. A further advantage of vertical drains is that the horizontal permeability in clay is often greater than the vertical one, and the consolidation process is therefore further accelerated.

By installing vertical drains in clay to be loaded consolidation may take place within a limited period of time and thereby be controlled so that remaining settlings will be of minor importance. The bearing capability of clay thus normally increases with consolidation since the reduction of the water contents is followed by a successively increased shearing strength.

It is known that the following demands may be made as regards vertical drains. They should
1. have a high permeability,
2. have a great flexibility in order to maintain the draining ability in connection with deformations, both vertical and horizontal, caused by the consolidation, at the same time, the drain must not be so rigid as to prevent consolidation by acting as a pile,
3. be continuous along the whole length thereof and have a good contact with natural and artificial draining layers,
4. be able to be installed in the clay without causing such a great disturbance that the usefulness of the drain is spoiled,
5. maintain the draining ability during the consolidation time,
6. maintain the above properties in connection with varying loads,
7. not be clogged by the surrounding earth.

The first known kind of vertical drain is, as far as known, the sand drain, which has been used to a great extent over the whole world. Sand drains consist of a cylindric column of draining granular material placed in a vertical hole in the clay. The holes are usually produced by means of an open ended tube that is pressed, rammed, vibrated or jetted into the earth.

Sand drains have the advantage that they can easily be given a great diameter and thereby a great through flow cross section. Among the disadvantages should be mentioned a bad flexibility and the risk for the occurrence of discontinuities due to stresses. One of the most serious diadvantages is, however, that during the driving down of the sand drain the earth is disturbed to such an extent that the compressibility is injuriously changed at the same time as the permeability of the earth normally decreases. In varved clay the horizontal stratification is disturbed thereby reducing the water conducting properties of the clay horizontally. The zone of disturbance may be up to approximately 3 times the diameter of the sand drain as driven down.

For eliminating the disadvantages of sand drains a bandlike drain of fibrous material, e.g. cardboard, with longitudinal channels has been developed. The advantage of a band drain is primarily that it can be installed in clay without causing such a great disturbance that the draining effect is spoiled. The band drain can furthermore be wound up and thus be stored on rollers which are easy to store and transport.

The wish to reduce the disturbance effects as compared with sand drains which for continuity reasons cannot have a too small diameter, has resulted in a further drain being developed. This drain consists of sand surrounded by a hose, originally made from jute, but nowadays from a synthetic material, with a diameter of normally 7 cm. The drain is manufactured in a factory and when installed the drain is fed down into a pre-drilled hole in the clay. The method of installation causes that also very solid layers in the earth can be drilled through, implying i.a. that this drain may be convenient to use if thick fillings have been laid on the clay, such as for instance in connection with fillings in water.

Furthermore, a drain has been developed in recent years constituting a further development of the cardboard drain and consisting of a corrugated plastics core surrounded by a specially treated paper. Between the core and the paper there are grooves for leading away the excess water. The dimensions of the drain are the same as those of the cardboard drain and the new drain can also be wound up on rollers. Besides a considerably greater capacity along the drain (approximately 10 times greater channel area) the new drain is considerably less sensitive to damage than the cardboard drain.

As compared with the sand drain also this drain has, however, a considerably smaller capacity due to the fact that its transversal dimensions are limited, primarily for installation technical reasons.

The object of the invention is to provide a method for producing drains eliminating the disadvantages of earlier draining methods while maintaining the advantages thereof. This object is attained by injecting into the earth, in situ, a substance, or substances, chemically reacting with, and/or physically cooperating with, one or more of the natural constituents of the earth to increase the permeability within the injection zone and thereby produce a drain, or a draining layer.

As compared with earlier methods for providing draining layers or drains in ground it has turned out that the new method, besides the economical advantages, has the great advantage that it does not at all, or at least to a very limited extent, prevent water from flowing along the natural draining layers of the earth, e.g. along the layers of varved clay to and from the artificial drains. The new method also has the further great advantage that the risk for clogging the draining layer or the drain can be practically totally eliminated. These advantages are obtained in combination with the fact that the through flow cross section of the drain can be made very large. Furthermore, producing drains according to the new method will not adversely change the compressibility properties of the earth, which by earlier methods in some cases has completely destroyed the usefulness that could otherwise have been obtained by the drains.

Another advantage is that the method according to the invention makes possible determination and choice of a suitable size, depth, length and shape of the drain or the draining layer in each particular case, whereby in each particular case the risk for destroying the drain by damage, deformations etcetera can be avoided, and a technically and economically correct method for draining or irrigation is obtained.

The injection of said substance or substances in the method according to the invention can be carried through in different ways. According to a first method a hole is drilled in the ground to a desired depth, or a perforated tube closed at the end is moved down. Then the substance in the form of a solution or a powder is introduced under pressure into the hole or tube so that it is pressed out in the surrounding ground material.

In some cases the chemical reaction or the physical action can be accelerated, or needs acceleration by further measures. An example of such measures is the application of an electric potential or voltage over the zone exposed to injection, or the application of pressure-force or a force impulse on the zone. As an example of the last mentioned method bombing with the active substance can be mentioned.

In accordance with a third method an earth drill with a hollow shaft is moved down into the earth and the substance is introduced through the drill during the downwards and/or upwards movement of the earth drill. The earth drill can be equipped with one or more blades for mixing the substance homogenously with the earth in the zone worked upon.

In a fourth method two parallel holes are provided in the ground to a desired depth. In one hole the active substance is introduced under pressure in the form of a liquid or a gas and the other hole is subjected to vacuum. By this migration of the substance through the earth from the first-mentioned hole to the last-mentioned one is obtained. It is also possible to use, instead of said holes, perforated tubes or band drains of a conventional type, through which the substance is introduced and suction is applied, respectively. It is easy to realize that it is possible to obtain by this method a draining area with an optional width extending between the injection and suction locations, respectively.

The above-mentioned methods can be used separately, or in combination, within a land area to be drained, and drains of different extension and shape can be obtained. Principally, the second and third methods provide drains with a well defined extension, whereas the first and fourth methods at least in some directions provide drains, the shape of which can be more or less indefinite. The choice of the type of drain and the extension thereof should be determined from case to case in practice.

Among active substances that can be used with the method according to the present invention lime can be mentioned, which can be fed into the earth in the form of a powder or in a liquid. More generally organic and inorganic calcium compounds, magnesium compounds, aluminum compounds, iron compounds and compounds of the earth metals and other substances can be used in order to bring about flocculation, ion absorption, gelation, wetting etcetera and for acting as accelerators etcetera. Among physically active substances petroleum derivatives may be mentioned. These substances are in general hydrophilic, gelable or act as accelerators.

What we claim is:

1. A method for consolidating a body of earth including substantially horizontal layers of varved clay by vertical draining and loading, comprising drilling a plurality of holes down into said body of earth substantially transverse to said layers of varved clay and injecting lime into the earth through said holes under pressure without substantial disturbance of said layers during the drilling and injecting steps, to chemically react with at least one of the natural constituents of the earth to thereby increase the permeability in spaced regions extending in the vicinity of each of said holes and having essentially direct contact with said layers, and loading said body of earth by a static pressure means so as to cause water outflow from the earth through said increased permeability regions from the natural draining layers of the earth along the layers of varved clay.

2. A method according to claim 1 comprising injecting said lime by introducing it under pressure through a first hole in the ground and subjecting a second hole at a distance from said first hole to a vacuum to thereby cause migration of the lime from the first hole towards the second hole.

3. A method according to claim 1 comprising promoting the chemical reaction by applying a voltage potential difference across said body of earth.

* * * * *